US012226696B2

(12) United States Patent
Ilse et al.

(10) Patent No.: US 12,226,696 B2
(45) Date of Patent: *Feb. 18, 2025

(54) GAMING WITH EARPIECE 3D AUDIO (71) Applicant: BRAGI GmbH, Munich (DE)

(72) Inventors: Maximilian Ilse, Munich (DE); Peter Vincent Boesen, Munich (DE)

(73) Assignee: BRAGI GMBH, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/491,434

(22) Filed: Oct. 20, 2023

(65) Prior Publication Data
US 2024/0042318 A1 Feb. 8, 2024

Related U.S. Application Data (63) Continuation of application No. 17/737,516, filed on May 5, 2022, now Pat. No. 11,806,621, which is a continuation of application No. 17/082,235, filed on Oct. 28, 2020, now Pat. No. 11,325,039, which is a continuation of application No. 15/795,863, filed on Oct. 27, 2017, now Pat. No. 10,821,361.

(60) Provisional application No. 62/417,064, filed on Nov. 3, 2016.

(51) Int. Cl.
A63F 13/54 (2014.01)
A63F 13/215 (2014.01)
A63F 13/211 (2014.01)
A63F 13/217 (2014.01)

(52) U.S. Cl.
CPC ............ A63F 13/54 (2014.09); A63F 13/215 (2014.09); A63F 13/211 (2014.09); A63F 13/217 (2014.09)

(58) Field of Classification Search
None
See application file for complete search history.

(56) References Cited

U.S. PATENT DOCUMENTS

| | | | |
|---|---|---|---|
| 2,325,590 A | 8/1943 | Carlisle et al. |
| 2,430,229 A | 11/1947 | Kelsey |
| 3,047,089 A | 7/1962 | Zwislocki |
| D208,784 S | 10/1967 | Sanzone |
| 3,586,794 A | 6/1971 | Michaelis |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Wikipedia, "Gamebook", https://en.wikipedia.org/wiki/Gamebook, Sep. 3, 2017, 5 pages.

(Continued)

Primary Examiner — Jay Trent Liddle
(74) Attorney, Agent, or Firm — Goodhue, Coleman & Owens, P.C.

(57) ABSTRACT

A method of providing an enhanced gaming experience includes steps of sensing environmental audio with at least one microphone of an earpiece, combining a game sound with the environmental audio to provide a composite audio signal, and transducing the composite audio signal at the earpiece. The game sound may be positioned within a three-dimensional audio environment. The composite audio signal may be transduced to provide a three-dimensional audio experience.

20 Claims, 9 Drawing Sheets (56) References Cited

U.S. PATENT DOCUMENTS

| | | |
|---|---|---|
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin et al. |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Torres Martin |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |

(56) References Cited

U.S. PATENT DOCUMENTS

| | | |
|---|---|---|
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf |
| 2008/0187163 A1 | 8/2008 | Goldstein |
| 2008/0253583 A1 | 10/2008 | Goldstein |
| 2008/0254780 A1 | 10/2008 | Kuhl et al. |
| 2008/0255430 A1 | 10/2008 | Alexandersson et al. |
| 2009/0003620 A1 | 1/2009 | Mckillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2012/0114132 A1 | 5/2012 | Abrahamsson et al. |
| 2013/0316642 A1 | 11/2013 | Newham |
| 2013/0335226 A1 | 12/2013 | Shen et al. |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0110587 A1 | 4/2015 | Hori |
| 2015/0146879 A1 | 5/2015 | Nguyen et al. |
| 2015/0148989 A1 | 5/2015 | Cooper et al. |
| 2015/0245127 A1 | 8/2015 | Shaffer |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0123758 A1 | 5/2016 | Benzaia et al. |
| 2016/0125892 A1 | 5/2016 | Bowen et al. |
| 2016/0353196 A1 | 12/2016 | Baker et al. |
| 2016/0360350 A1 | 12/2016 | Watson et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0142511 A1 | 5/2017 | Dennis |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0263236 A1 | 9/2017 | Boesen et al. |
| 2017/0273622 A1 | 9/2017 | Boesen |
| 2018/0046431 A1 | 2/2018 | Shivappa et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 11/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.

(56) References Cited

OTHER PUBLICATIONS

Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "Bmw introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014), pp. 1-51.
BRAGI Update—Arrival of Prototype Chassis Parts—More People—Awesomeness (May 13, 2014), pp. 1-8.
BRAGI Update—Chinese New Year, Design Verification, Charging Case, More People, Timeline(Mar. 6, 2015), pp. 1-18.
BRAGI Update—First Sleeves From Prototype Tool—Software Development Kit (Jun. 5, 2014), pp. 1-8.
BRAGI Update—Let's Get Ready to Rumble, a Lot to Be Done Over Christmas (Dec. 22, 2014), pp. 1-18.
BRAGI Update—Memories From April—Update on Progress (Sep. 16, 2014), pp. 1-15.
BRAGI Update—Memories from May—Update on Progress—Sweet (Oct. 13, 2014), pp. 1-16.
BRAGI Update—Memories From One Month Before Kickstarter—Update on Progress (Jul. 10, 2014), pp. 1-17.
BRAGI Update—Memories From the First Month of Kickstarter—Update on Progress (Aug. 1, 2014), pp. 1-16.
BRAGI Update—Memories From the Second Month of Kickstarter—Update on Progress (Aug. 22, 2014), pp. 1-15.
BRAGI Update—New People @BRAGI—Prototypes (Jun. 26, 2014), pp. 1-9.
BRAGI Update—Office Tour, Tour to China, Tour to CES (Dec. 11, 2014), pp. 1-14.
BRAGI Update—Status on Wireless, Bits and Pieces, Testing—Oh Yeah, Timeline(Apr. 24, 2015), pp. 1-18.
BRAGI Update—The App Preview, the Charger, the SDK, Bragi Funding and Chinese New Year (Feb. 11, 2015), pp. 1-19.
BRAGI Update—What We Did Over Christmas, Las Vegas & CES (Jan. 19, 2014), pp. 1-21.
BRAGI Update—Years of Development, Moments of Utter Joy and Finishing What We Started(Jun. 5, 2015), pp. 1-21.
BRAGI Update—Alpha 5 and Back to China, Backer Day, on Track(May 16, 2015), pp. 1-15.
BRAGI Update—Beta2 Production and Factory Line(Aug. 20, 2015), pp. 1-16.
BRAGI Update—Certifications, Production, Ramping Up (Nov. 13, 2015), pp. 1-15.
BRAGI Update—Developer Units Shipping and Status(Oct. 5, 2015), pp. 1-20.
BRAGI Update—Developer Units Started Shipping and Status (Oct. 19, 2015), pp. 1-20.
BRAGI Update—Developer Units, Investment, Story and Status(Nov. 2, 2015), pp. 1-14.
BRAGI Update—Getting Close(Aug. 6, 2015), pp. 1-20.
BRAGI Update—On Track, Design Verification, How It Works and What's Next(Jul. 15, 2015), pp. 1-17.
BRAGI Update—On Track, on Track and Gems Overview (Jun. 24, 2015), pp. 1-19.
BRAGI Update—On Track, on Track and Gems Overview (Jun. 24, 15), pp. 1-19.
BRAGI Update—Status on Wireless, Supply, Timeline and Open House@BRAGI(Apr. 1, 2015), pp. 1-17.
BRAGI Update—Unpacking Video, Reviews on Audio Perform and Boy Are We Getting Close(Sep. 10, 2015), pp. 1-15.
Healthcare Risk Management Review, "Nuance updates computer-assisted physician documentation solution" (Oct. 20, 2016), pp. 1-2.
Hoffman, "How to Use Android Beam to Wirelessly Transfer Content Between Devices", (Feb. 22, 13).
Hoyt et al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces a Health + Mobility Concept for Wellness in Mobility", Fountain Valley, Californa (2017), pp. 1-3.
International Search Report & Written Opinion, PCT/EP2016/070231 (Nov. 18, 2016) 12 pages.
Last Push Before the Kickstarter Campaign Ends on Monday 4pm CET (Mar. 28, 2014), pp. 1-7.
Nigel Whitfield: "Fake tape detectors, 'from the stands' footie and UGH? Internet of Things in my set-top box"; http://www.theregister.co.uk/2014/09/24/ibc_round_up_object_audio_dina_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014), pp. 1-14.
Stretchgoal—The Carrying Case for the Dash (Feb. 12, 2014), pp. 1-9.
Stretchgoal—Windows Phone Support (Feb. 17, 2014), pp. 1-17.
The Dash + the Charging Case & the BRAGI News (Feb. 21, 14), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.

GAMING WITH EARPIECE 3D AUDIO

RELATED APPLICATIONS

This application is a continuation of U.S. patent application Ser. No. 17/737,516 filed on May 5, 2022 which is a continuation of U.S. patent application Ser. No. 17/082,235 filed on Oct. 28, 2020 now patented as U.S. Pat. No. 11,325,039 which is a continuation of and claims priority to U.S. patent application Ser. No. 15/795,863 filed on Oct. 27, 2017 now patented as U.S. Pat. No. 10,821,361 which claims priority to U.S. Provisional Patent Application No. 62/417,064, filed on Nov. 3, 2016 and all entitled "Gaming with Earpiece 3D Audio", hereby incorporated by reference in their entireties.

FIELD OF THE INVENTION

The present invention relates to gaming. More particularly, but not exclusively, the present invention relates to enhanced gaming using wearable devices.

BACKGROUND

One recent game that has enjoyed immense initial popularity has been POKÉMON GO from Niantic, Inc. In normal operation a mobile device such as a phone is used which includes a camera. A user may observe video acquired by the phone by viewing the display of the phone. As a part of the gaming experience, an image may be inserted by the game in front of a video representation of an actual object.

What is needed are new and improved methods and systems for improving the gaming experience, especially those that improve the audio experience of the game.

SUMMARY

Therefore, it is a primary object, feature, or advantage of the present invention to improve over the state of the art.

It is a further object, feature, or advantage of the present invention to improve gaming experiences.

It is a still further object, feature, or advantage of the present invention to improve gaming audio experiences.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a method of providing an enhanced gaming experience is provided. The method includes sensing environmental audio with at least one microphone of an earpiece, combining a game sound with the environmental audio to provide a composite audio signal, and transducing the composite audio signal at the earpiece. The game sound may be positioned within a three-dimensional audio environment. The composite audio signal may be transduced to provide a three-dimensional audio experience. The method may further include sensing user movement with at least one inertial sensor of the earpiece. The method may further include generating the game sound based on the user movement. The method may further include communicating the user movement to a computing device executing a game, determining a game sound based on the user movement from the computing device, and generating the game sound based on the user movement.

According to another aspect, a method of providing an enhanced gaming experience is provided. The method includes maintaining an augmented reality video environment associated with a camera and video display device, maintaining an augmented reality audio environment associated with a set of earpieces comprising microphones and speakers, and generating a gaming experience using the augmented reality video environment and the augmented reality audio environment. The set of earpieces may include one or more inertial sensors. The head position of a user may be sensed using the one or more inertial sensors. The augmented reality video environment may include game images and the augmented reality audio environment may include game sounds. At least a portion of the game images within the augmented reality video environment may have corresponding game sounds present in the augmented reality audio environment.

According to another aspect, a method of providing an enhanced gaming experience includes steps of determining a location of a user, sensing environmental audio with at least one microphone of at least one earpiece, selecting a game sound based on the location of the user, generating the game sound based on relative position between the location of the user and a perceived source location associated with the game sound. The method may further include transducing the game sound and the environmental audio at a speaker of the at least one earpiece. The method may further include selecting a game image based on the location of the user and displaying the game image to the user based on the location of the user.

DETAILED DESCRIPTION

The present invention relates to an enhanced gaming experience. Current gaming systems, such as POKEMON GO, utilize a phone, a camera, and an image inserted in front of an object. In operation a mobile device such as a phone is used which includes a camera. A user may observe video acquired by the phone by viewing the display of the phone. As a part of the gaming experience, an image may be inserted by the game in front of a video representation of an actual object on the display of the mobile device. Thus, a user may, by viewing the display of the mobile device, see actual video imagery acquired with the camera as well as additional imagery added as a part of the game. Game imagery may be added based on the location of the user such as through using GPS location data. Thus, when a user is at a specific location they may be able to view specific game imagery which is mapped to that location.

According to one aspect, one or more ear pieces or headsets are used to enhance audio aspects of the gaming experience. The one or more earpieces or headsets may use an AUDIO TRANSPARENCY feature where ambient audio is sensed at one or more microphones of the earpiece and then reproduced at one or more speakers of the earpiece. Thus, even though a user may be wearing the earpiece or headset they are still able to hear ambient or environmental sound. In addition, game sounds may be added to the ambient or environmental sounds. The game sounds may be mapped to specific locations. Thus, when the user is at a specific location, they may hear a particular sound. In addition, sound processing may be performed based on the relative location of the user and the location of the source of the sound. Thus, for example, the sound may be heard when the user is at a set distance from the location of the source of the sound and the intensity of the sound may increase as the user approaches the location of the source of the sound. Similarly, 3D sound processing may be performed based on the relative location of the user (and both the right and left ears of the user) to the location of the source of the sound thus, for example, a user may hear the sound in a manner which provides them with spatial context as to where the source of the sound is located relative to their current position.

Figure 1:
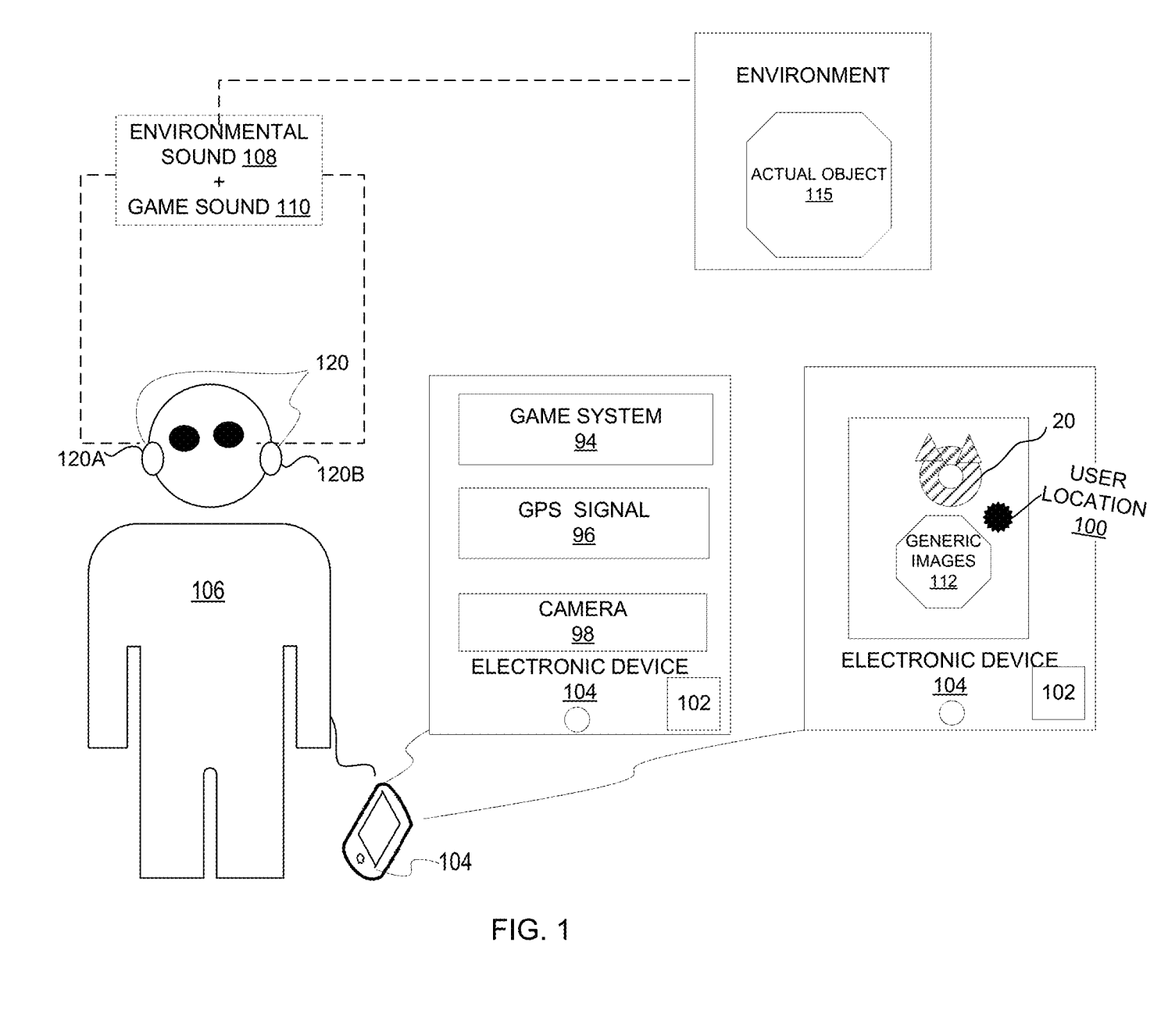
FIG. 1 is a pictorial representation of an enhanced gaming experience using audio transparency in accordance with the illustrative embodiments.

FIG. 1 displays a user 106 experiencing enhanced gaming with the audio transparency feature. The object image 20 on the phone 104 represents a clue or object in the game system 94. The phone 104 is not limited to a phone or smart phone, but may encompass other electronic devices, including but not limited to other mobile devices, iPADs, tablets, game consoles, etc. FIG. 1 displays two electronic devices intended to show the detail of two systems or two aspects of a system operating simultaneously within one device. The game system 94 may encompass all gaming applications or systems played on or incorporating any electronic devices. As the user 106 moves, the object image 20 on the phone 104 may move in response to updated position information received via a geospatial navigation system such as a global positioning ("GPS") system receiver or other location tracking system. Of course, other types of navigation systems may be used. For example, a GLOSNASS position may be provided, a position may be interpolated based on nearby cell phone towers, a position may be determined based on one or more WiFi routers within range, a position may be determined based on a combination of one or more cell phone towers within range and one or more WiFi routers within range, the position may be determined based on sensing movement via one or more inertial sensors, or the position may be otherwise determined. The GPS signal 96 received at a GPS receiver of the phone 104 may be used to track the movement of the user 106. The game system 94 coordinates the user's movement as determined using the GPS signal 96 with the object image 20 on the phone. As the user 106 approaches a certain point, shown in FIG. 1 as the user location 100, the phone may vibrate or make a sound to alert the user 106. This sound is depicted in FIG. 1 as the game sound 110. Upon hearing the game sound 110, the user 106 has options, one of which is to continue the game by touching the screen of the electronic device 104 to activate the object image 20 or other generic images 112 in the game system 94. The user 106 may also approach a certain point and hear only the environmental sounds, as transmitted clearly from the wireless earpiece speakers to the internal microphone. Or, the user may reach a certain location and hear the game sounds overlapping with the environmental sounds. Actions of the user may vary depending on the particular gaming experience. In one embodiment of the enhanced gaming experience, a new sound would be inserted in front of the game sound 110. This new sound, depicted in FIG. 1 as environmental sound 108, would be framed by the position of the phone 104 and its sensors 102. This environmental sound 108 may come from the surrounding environment of the user 106, from the outside world, or it may be a sound generated by another electronic device such as a phone, an earpiece, or another external device. In one embodiment, the microphone of the earpiece(s) 120 senses the environmental sound 108 or the external sound.

Figure 2:
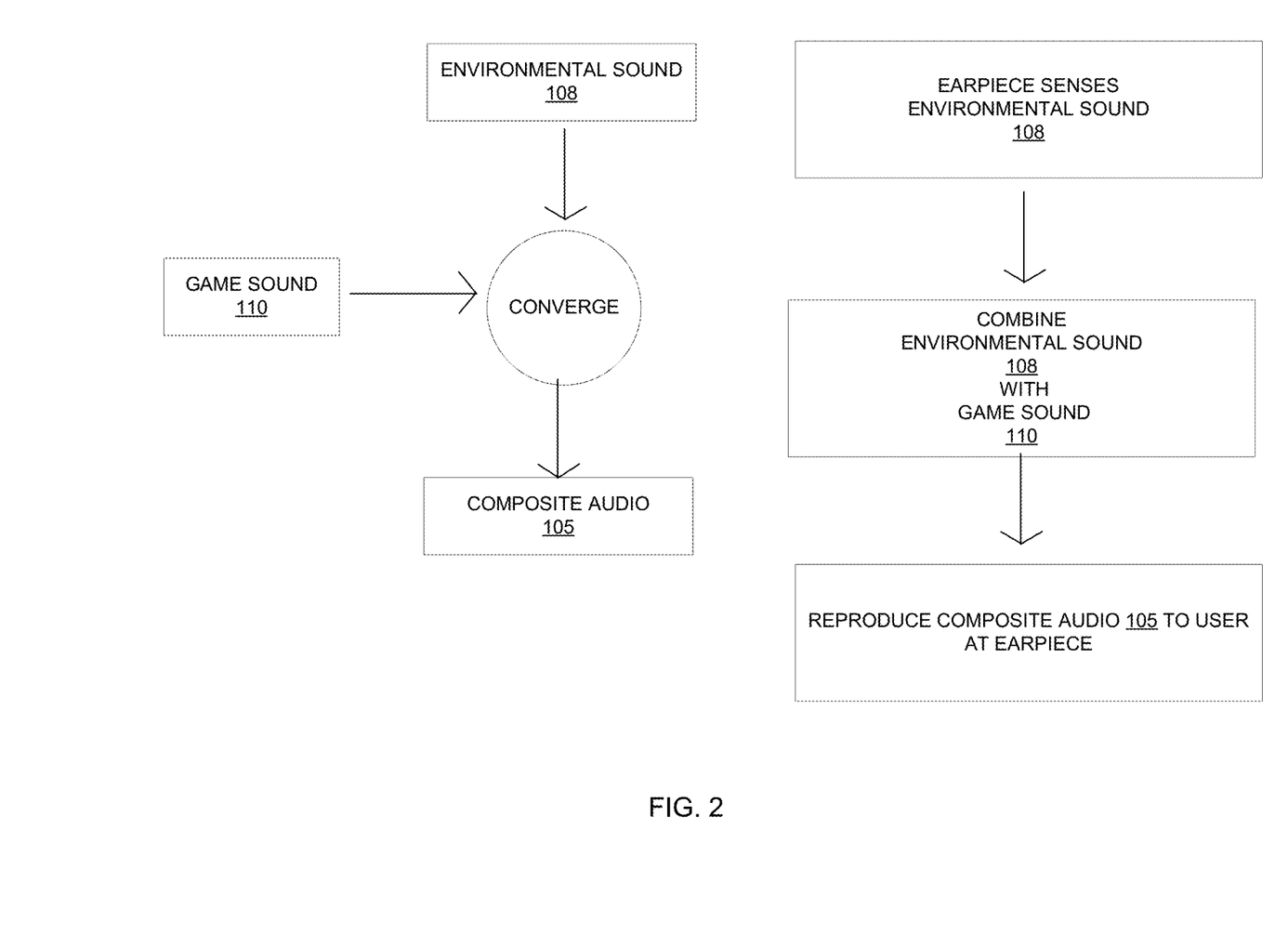
FIG. 2 is a block diagram of audio transparency via the convergence of environmental and game audio as shown in the illustrative embodiments.

FIG. 2 displays an overview of the audio transparency technology. FIG. 2 depicts the convergence of the environmental sound 108 with the game sound 110 to form the composite audio 105. The wireless earpiece(s) 120, described in further detail later herein sense the environmental sound 108. The environmental sound 108 and the game sound 110 are combined, and the user 106 experiences the composite audio 105. This composite audio may be considered a feature of AUDIO TRANSPARENCY. The overlap of sounds extends to sounds from the game combined with sounds from other sources, such as other external devices or other users. Other earpiece users may participate in the game with the user, and the audio messages these users send may overlap with the game sounds or the environmental sounds in an ambient audio format. External speakers may transmit environmental sounds to the microphone of the user's earpieces. At the same time, the user may hear audio messages sent from other earpiece users. These audio messages may be restricted or require acceptance from the user before the message is relayed, depending on the user's earpiece settings.

Figure 3:
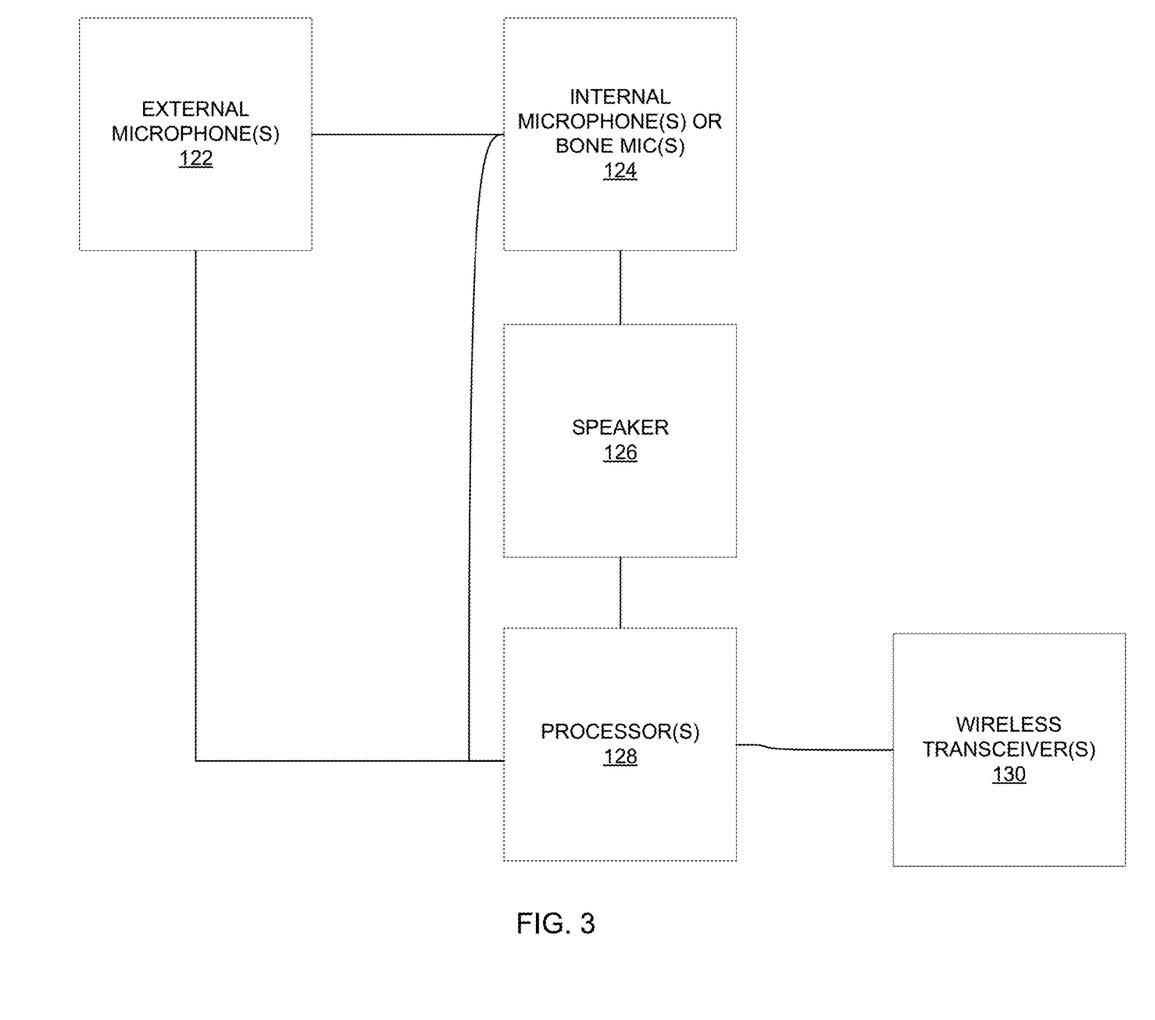
FIG. 3 is a flowchart depicting one embodiment of wireless earpiece components used to create a composite audio effect.

FIG. 3 is a flowchart depicting one use of the earpiece microphones to create the composite audio 105. In FIG. 3, the external microphones 122 of the earpiece(s) 120 may convey the environmental sounds 108 to the processor(s) 128, internal microphones 124, speaker 126, or the wireless transceivers 130. As the external microphone 122 conveys the environmental sound 108, the internal or bone microphone 124 may convey the game sound 110. As part of the audio transparency technology, the user 106 may experience game sounds 110 overlapped with environmental sounds 108. The composite audio may also be created as the wireless transceiver relays audio messages from other earpiece users, and the microphone conveys environmental sounds. Or the internal microphone of the wireless earpiece may convey sounds from other sources, such as music saved on an electronic device, or music streamed from a server, as the wireless transceiver conveys audio messages. The composite audio effect may also be created by layering the game sounds with music from another device and environmental sounds.

Figure 4:
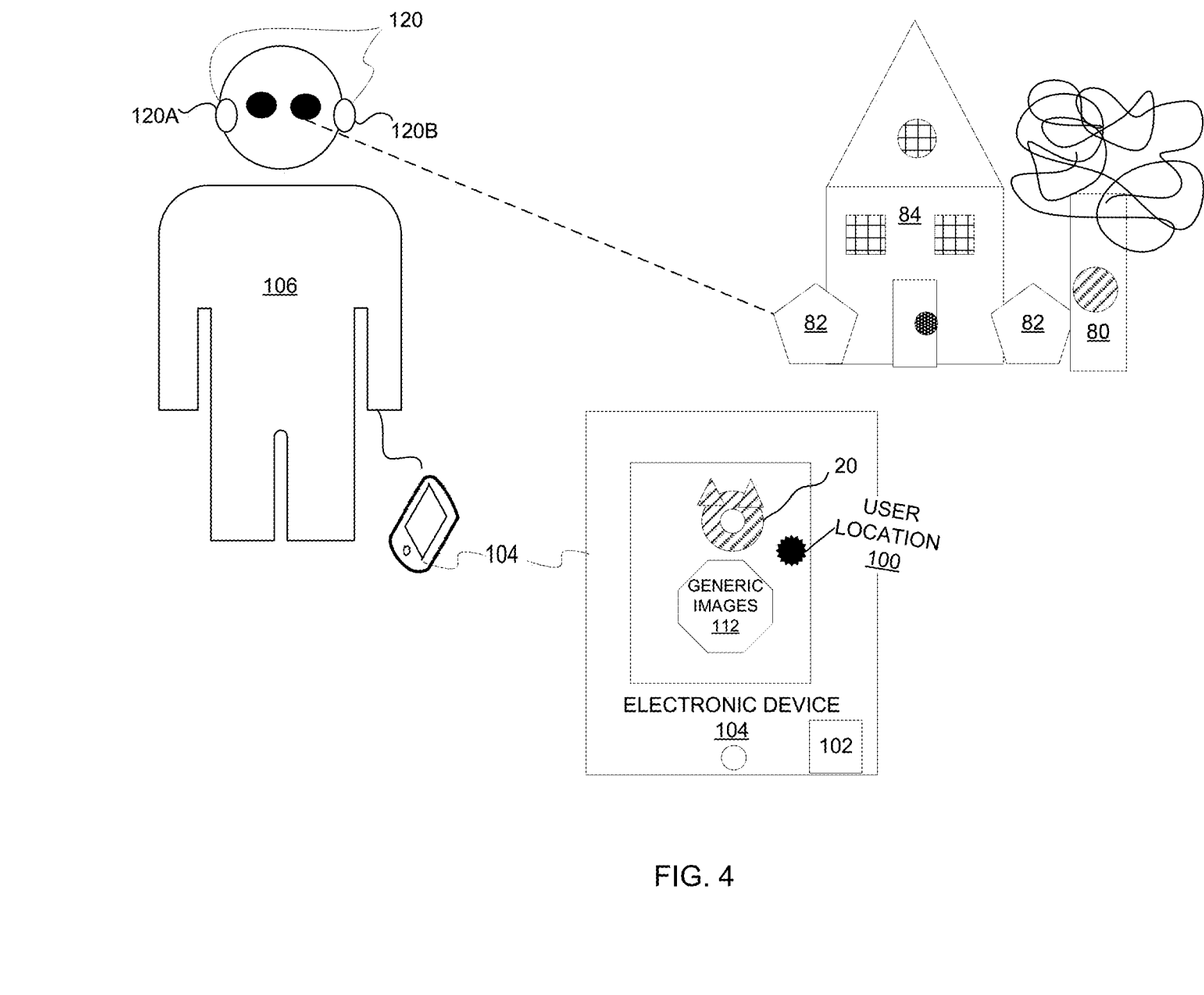
FIG. 4 is an illustrative example of the production of a composite audio effect via the user's wireless earpieces, a gaming system, and a scene in the user's surrounding environment.

FIG. 4 depicts one non-limiting example of this audio transparency technology. FIG. 4 shows a user 106 looking at a house 84, a tree 80, and several bushes 82 in front of the house. The audio from the world (in this example, sounds from the house and surrounding foliage), would be transmitted normally to the earpiece or another device as the environmental sound 108. As the user discovers the clue or item being searched for, shown in FIG. 4 as the object image 20, the game alerts the user by introducing its own sound, the game sound 110, sonically positioned where the item would be able to be detected. No gaming experiences currently overlay game sounds with environmental sounds. One type of enhanced experience is created as game sounds 110 are interlaced with environmental sounds 108 transmitted using audio transparency technology which provides for sensing environmental sounds 108 using one or more earpieces 120 and then reproducing the environmental sounds 108 using one or more microphones of the earpiece. Although the example above describes outdoor sounds, environmental sounds may include all varieties of surrounding environments, including but not limited to: musical sounds, nightlife, churches, temples, and cathedrals, bells, airport sounds, fairground sounds, the sounds of sports games, travel sounds, the sounds of storms, environmental sounds from museums and libraries, birdsongs, animal calls, etc. Generic images 112 may also create game sounds different from those created by the object image 20, and these generic sounds may also be interlaced with the game sound 110 and the environmental sounds 108 to create another form of the composite audio sound 105. Generic images in the game may correspond with the environmental sounds. The images in the game may change according to the environmental sound the user is hearing. For example, if a user is near a cathedral, the GPS locator or the camera may capture this image. Then the earpiece may pick up the sound of the bell from the surrounding environment. Or, the earpiece may signal the user's electronic device or send a signal to a server to reproduce the sound of a bell. As the user hears the bell through the earpiece, a signal may be sent from the earpiece to the game to change the image on the phone to a cathedral (the image that corresponds to the sound of the bell).

Figure 5:
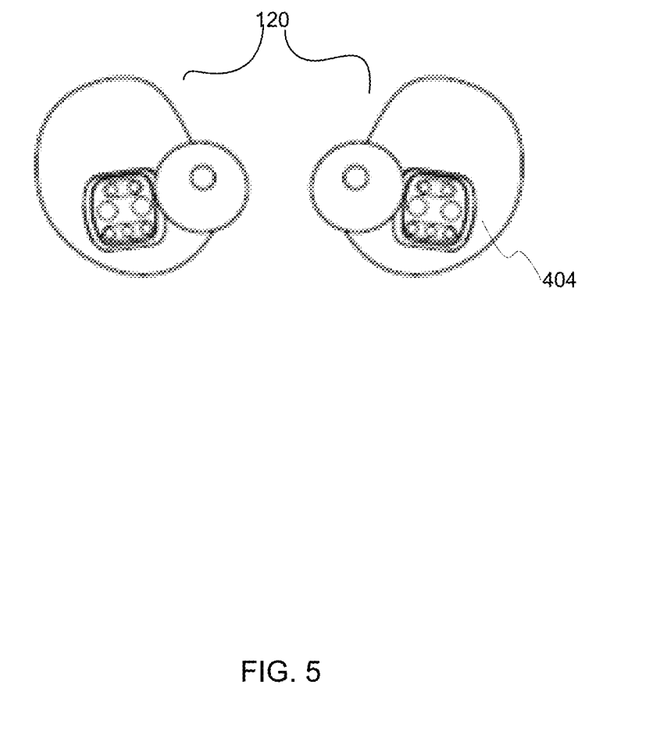
FIG. 5 is a pictorial representation of wireless earpieces with sensors.
Figure 6:
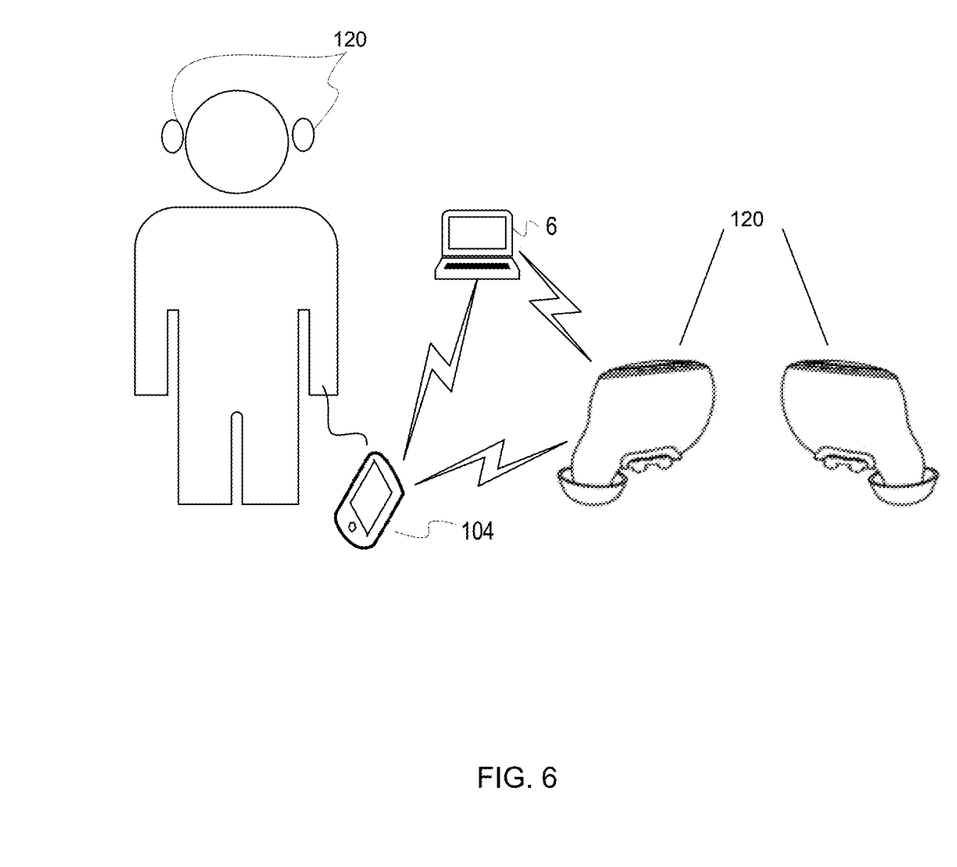
FIG. 6 is a pictorial representation of the wireless communication via the user, the earpieces worn by the user, a smartphone, and an electronic device in accordance with the illustrative embodiments.

FIG. 5 displays the wireless earpieces 120, also labeled earpieces 120. FIG. 5 illustrates the earpiece sensors, which may include several different forms of sensors, to be used together or individually, including but not limited to inertial sensors, accelerometers, gyroscopes, photoelectric sensors, etc. The sensors may transmit different information to the earpieces, including but not limited to software instructions, data transmission, wireless intrabody communication, biomedical monitoring, etc. The sensors may track the heart rate, steps, or other bodily movements and activity of the user throughout the game. The sensors may be configured to work with the earpieces according to certain user preferences. For example, the sensors may be preset to work only when the user is playing the game. They may be preset to work only via galvanic communication, or only on battery power. The earpieces may transmit data from the sensors to the user via audio messages, or by sending messages to the user's electronic device. The earpieces may also transmit data from the sensors to smart glasses, where the user may read the data across the screen of the glasses. The earpieces may communicate with the sensor in different ways, depending on the configuration of the sensor. FIG. 6 displays a user 106 wearing the earpieces, and the earpieces communicating with a phone 104 and computer. Other electronic devices, though not included in FIG. 6, may communicate with the earpieces 120.

Figure 7:
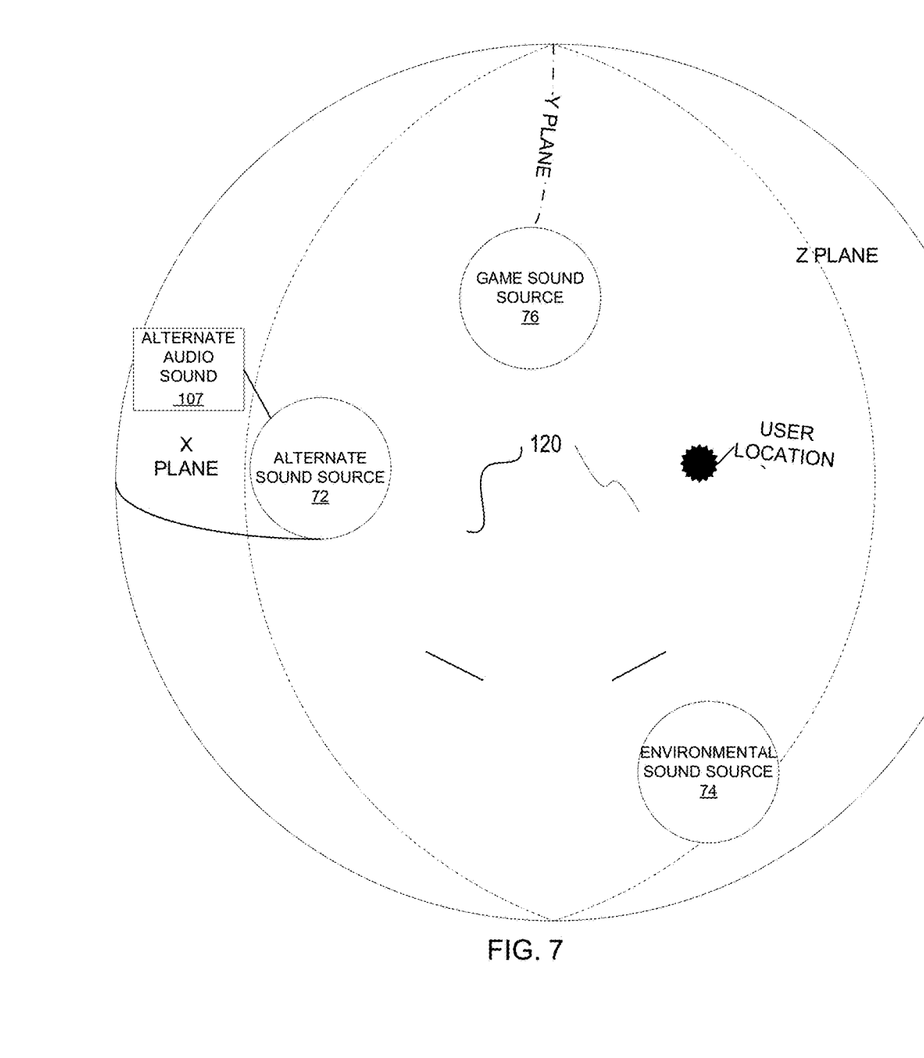
FIG. 7 is a flowchart of the appearance of the imaging and three-dimensional audio effects to the user as the user moves in accordance with the illustrative embodiments.

FIG. 7 shows another embodiment of an enhanced gaming experience, as the game sound 110 is positioned within a three-dimensional audio environment. FIG. 7 depicts the simulation of a three-dimensional audio environment. The earpieces 120, worn by the user 106 (not pictured), are surrounded by multiple sound sources. The embodiment is not limited to the three sources displayed in FIG. 7. The three sources occupy three different planes in space, displayed in the figure as the X, Y, and Z PLANES. The game sound 110 in the Y-plane appears to the user 106 to come from the game sound source 76. The environmental sound source 74 gives the illusion of the environmental sound 108 emanating from the Z-plane. And an alternate audio sound 107 appears to come from the alternate sound source 72 in the X-plane. By performing sound localization within the x, x-y or alternately the x-y-z planes, the user is provided with a more immersive experience. The audio signal is transduced to provide a three-dimensional audio experience for the user. The audio sounds appear to come from above, behind, and below the user. The effect of tricking the user's brain or simulating actual three-dimensional ("3D") audio may be created with game sounds coming from the phone or another electronic device (iPAD, tablet, computer, etc.), in combination with sounds coming from the user's wearable earpieces, and from the actual outside environment, enhanced with the wireless earpieces. The effect may occur via speakers inside the earpieces which use head-related transfer function, HRTF filters, cross talk cancellation techniques, and other devices that mimic the appearance of sound waves emanating from a point in the user's three-dimensional space. FIG. 3 depicts one mechanism by which the wireless earpieces may be used to create this three-dimensional audio effect. The external microphone 122 brings in the noise of the outside world or the user's surroundings, creating an environmental sound 108. At the same time, the internal or bone microphones 124 may convey the game sound 110 and an alternate audio sound 107. A three-dimensional audio transparency effect is created as the game sound 110 is overlaid with the environmental sounds 110 and the alternate audio sound 107. If environmental sounds 108 are combined with game sounds 110, a two-dimensional audio effect can be created as well.

Figure 8:
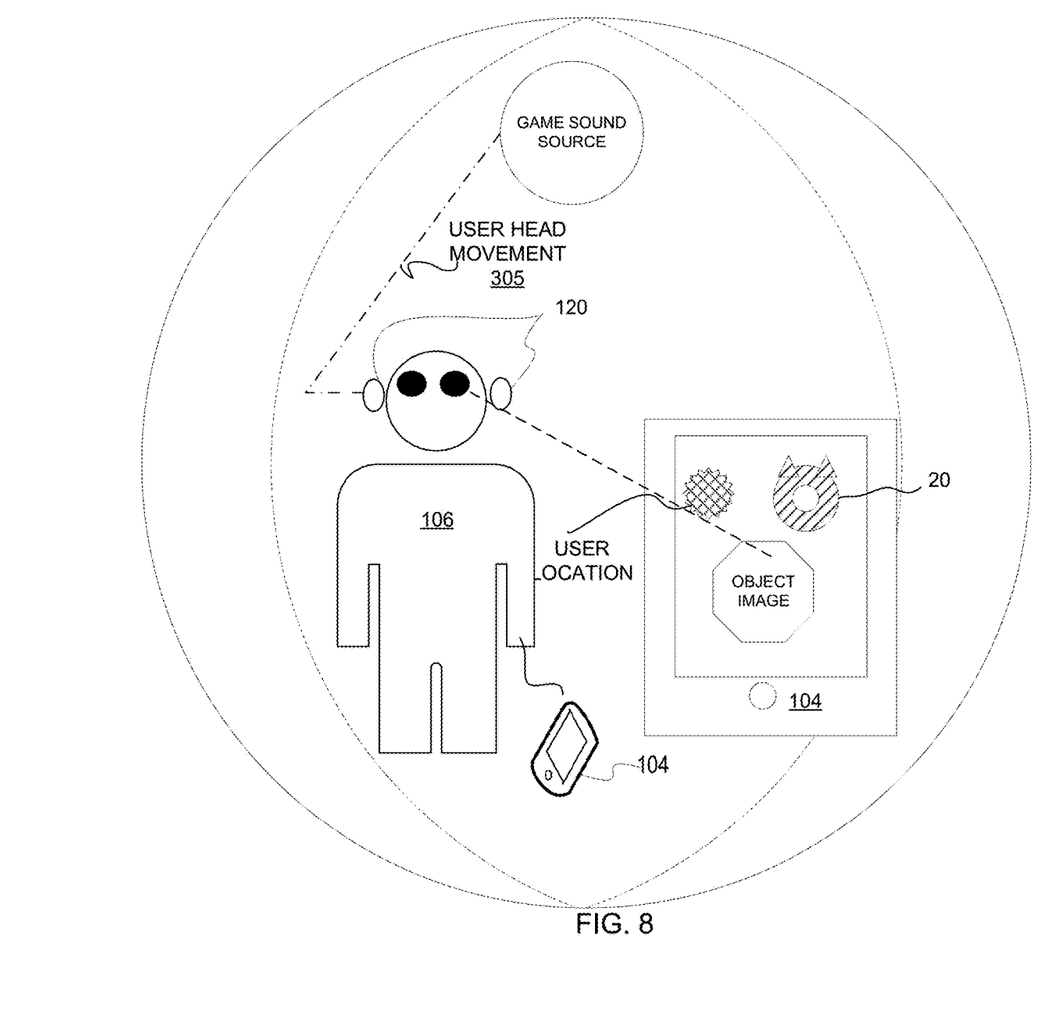
FIG. 8 is a pictorial representation of an enhanced gaming system depicting the interaction between the user and the appearance of the game sound source as a smart phone tracks the user's location.

In another embodiment, shown in FIG. 8, the audio and imaging data streams are separated before they reach the user 106. This separation of audio and visual streams creates an augmented reality. The camera 98 of the phone 104 would be detached so that it could not immediately transfer information to the phone in conjunction with the audio system. For example, if the camera 98 was pointed toward the ground and the user was expecting a certain sound to emanate, the separation of audio and visual streams would allow the user to turn his/her/its head and pick up audio that would not necessarily be the same as that which would be detected by the camera-based phone position. The earpieces 120 may contain inertial sensors 404 to detect the user's head movements and generate a signal to emanate a certain sound. With the user's fixed point of reference created by disconnecting the camera, the earpieces allow the user, with a turn of the head (user head movement 305), to detect different audio streams from the point of view of the inertial sensors in the earpiece. The earpiece settings allow the user 106 to distinguish the camera-based outputs from the augmented audio reality which incorporates the audio transparency and sound features. This separation of audio and visual reality may also be created via smart glasses sharing data with the earpieces. The smart glasses may change the user's view of the game, or incorporate environmental images into the screen of the glasses. Overlapping the visual images in the game with images portrayed in the smart glasses may correspond with the overlap of audio effects between the earpieces, and the environment and game sounds. This overlap of visual and audio images created by the smart glasses and the wireless earpieces may create a different but enhanced gaming experience for the user.

Figure 9:
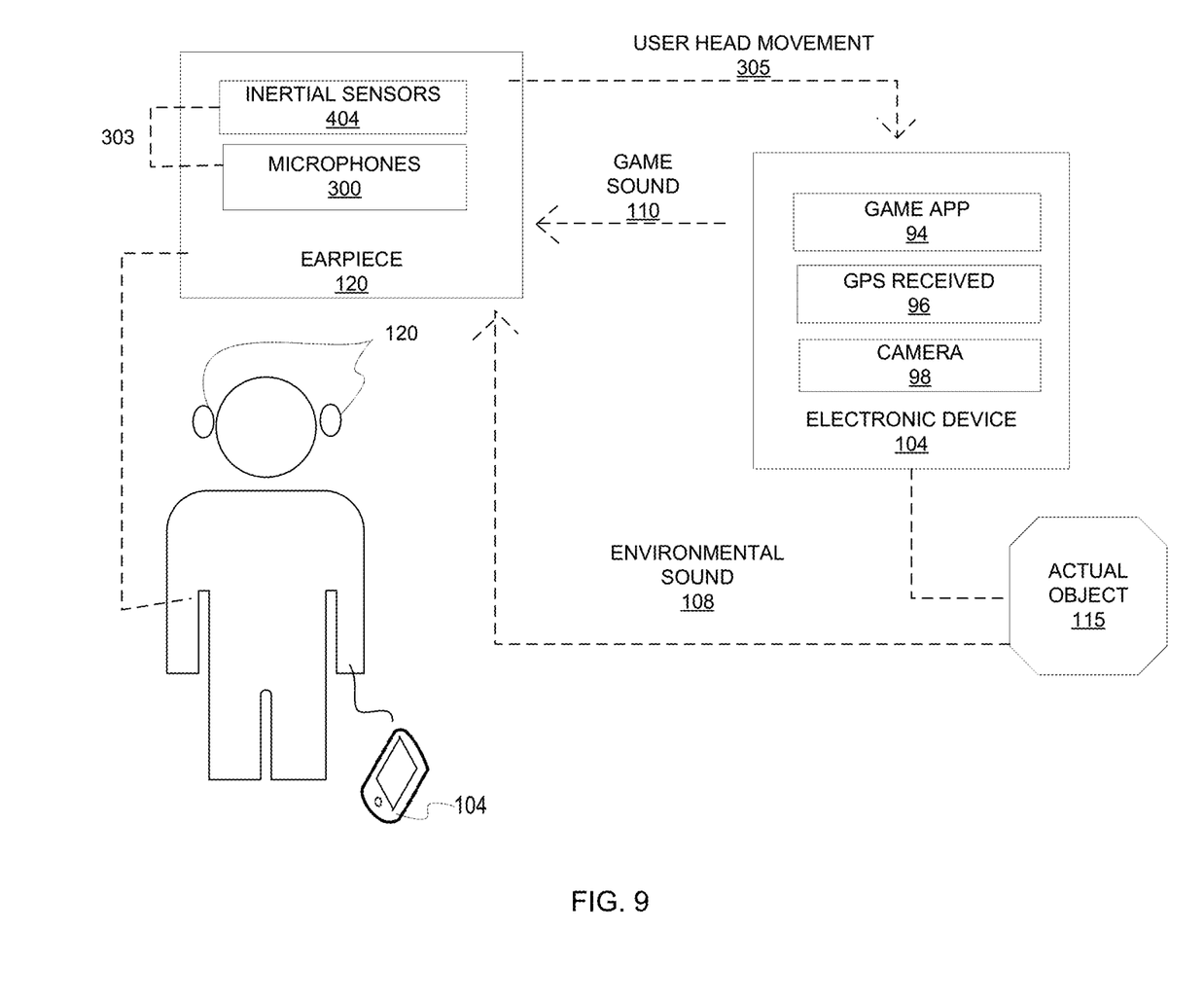
FIG. 9 is a pictorial representation of the interaction between the user's head movements, the inertial sensors of the earpieces, the gaming system, and the sounds heard by the user.

Another embodiment of the enhanced gaming experience, depicted in FIG. 9, utilizes inertial sensors which measure and report the movement of the user. Such sensors may indicate measurements including but not limited to the user's specific force, angular rate, magnetic field, etc. The inertial sensor(s) 404 may be located on the earpiece, or another wearable device of the user. As the inertial sensor 404 detects the user movement, the sensor may relay a signal to the phone to generate a game sound 110 based on the user movement. The inertial sensor 404 may also relay a signal 303 to the microphones 300 of the earpiece 120 or other wearable device to generate a sound. One or multiple inertial sensors 404 may be used to track the head position of a user (depicted in FIG. 10 as user head movement 305) and to generate a game or environmental sound based on the head position of the user. Examples of inertial sensors 404 include but are not limited to accelerometers, gyroscopes, magnetometers, etc. The inertial sensors may be used with the earpieces and the gaming system to create a unique gaming experience for the user. As the user moves his/her head, the inertial sensors may send signals to the wireless earpieces. The earpieces may generate sounds when the user's head is not turned toward the game. Or the earpieces may generate sounds as the user moves and controls the image within the game.

Therefore, various methods, systems, and apparatus have been shown and described. Although specific examples and embodiments are set forth herein it is to be understood that the present invention contemplates numerous variations, options, and alternatives.

What is claimed is:

1. A method of providing an enhanced gaming experience to a user, the method comprising steps of:
    mapping a game sound source to a physical position using an electronic device;
    determining a physical user location of the user using the electronic device;
    sensing environmental audio with at least one microphone of an earpiece in operative communication with the electronic device;
    generating a game sound by the electronic device, the physical position mapped to the game sound source, and the physical location of the user to provide spatial context as to where the game sound source is located relative to the user within a three-dimensional audio environment;
    combining the game sound positioned within the three-dimensional audio environment with the environmental audio to provide a composite audio signal; and
    transducing the composite audio signal at the earpiece to provide a three-dimensional audio experience.

2. The method of claim 1 further comprising sensing movement of the user with at least one inertial sensor of the earpiece.

3. The method of claim 2 wherein the generating the game sound is based at least in part on the user movement.

4. The method of claim 1 further comprising tracking head position of the user using at least one inertial sensor.

5. The method of claim 4 wherein the generating the game sound is based at least in part on the head position of the user.

6. The method of claim 1 further comprising acquiring digital imagery using a camera of the electronic device.

7. The method of claim 6 further comprising displaying the digital imagery on a display of the electronic device.

8. The method of claim 7 further comprising displaying game imagery on the display of the electronic device.

9. The method of claim 8 wherein the digital imagery and the game imagery are simultaneously displayed to provide an augmented reality video environment.

10. A method of providing an enhanced gaming experience to a user, the method comprising steps of:
    mapping a game sound source to a physical position using an electronic device;
    determining a physical user location of the user using the electronic device;
    sensing environmental audio with at least one microphone of at least one wearable device;
    generating a game sound, the physical position mapped to the game sound source, and the physical location of the user to provide spatial context as to where the game sound source is located relative to the user within a three-dimensional audio environment;
    combining the game sound positioned within the three-dimensional audio environment with the environmental audio to provide a first composite audio signal and a second composite audio signal for a wearable device; and
    transducing the first composite audio signal at a first speaker of the wearable device and the second composite audio signal at a second speaker of the wearable device to provide a three-dimensional audio experience.

11. The method of claim 10 further comprising sensing movement of the user with at least one inertial sensor of the wearable device.

12. The method of claim 11 wherein the generating the game sound is based at least in part on the user movement.

13. The method of claim 10 further comprising tracking head position of the user using at least one inertial sensor of the wearable device.

14. The method of claim 13 wherein the generating the game sound is based at least in part on the head position of the user.

15. The method of claim 10 wherein the wearable device comprises a first wireless earpiece and a second wireless earpiece.

16. The method of claim 10 wherein the wearable device is a headset.

17. A method of providing an enhanced gaming experience, comprising:
    maintaining an augmented reality video environment associated with a camera and video display device;
    maintaining an augmented reality audio environment associated with a wearable device comprising microphones and speakers;
    generating a gaming experience using the augmented reality video environment and the augmented reality audio environment;

wherein the maintaining of the augmented reality audio environment is performed by:
mapping a game sound source to a physical position,
determining a physical user location of the user,
sensing environmental audio with at least one microphone of the wearable device,
generating a game sound, the physical position mapped to the game sound source, and the physical location of the user to provide spatial context as to where the game sound source is located relative to the user within a three-dimensional audio environment,
combining the game sound positioned within the three-dimensional audio environment with the environmental audio to provide a composite audio signal,
transducing the composite audio signal at the wearable device to provide a three-dimensional audio experience for the augmented reality audio environment.

18. The method of claim 17 wherein the wearable device further includes one or more inertial sensors.

19. The method of claim 18 wherein head position of a user is sensed using the one or more inertial sensors and wherein the head position is used in maintaining the augmented reality audio environment.

20. The method of claim 17 wherein the augmented reality video environment includes game images.

* * * * *